Figure 1:
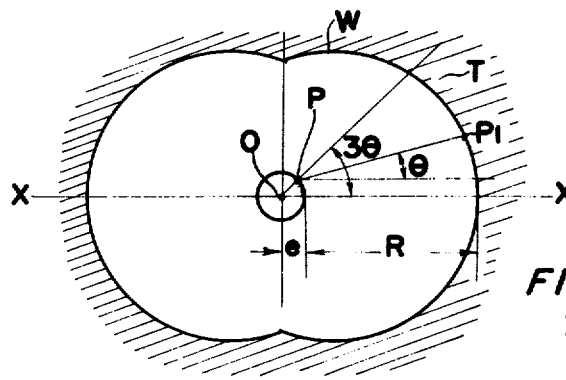

United States Patent [19]
Yoshino

[11] 3,891,406
[45] June 24, 1975

[54] INNER SURFACE HONING DEVICE WITH WORKPIECE TRANSFER MEANS

[75] Inventor: Tsutomu Yoshino, Hiroshima, Japan
[73] Assignee: Toyo Kogyo Co., Ltd., Hiroshima, Japan
[22] Filed: Sept. 16, 1974
[21] Appl. No.: 506,049

[30] Foreign Application Priority Data
Sept. 22, 1973 Japan............................ 48-107391

[52] U.S. Cl.......... 51/105 R; 51/50 R; 51/215 AR; 51/215 CP; 51/DIG. 32; 214/1 BC
[51] Int. Cl..................... B24b 5/08; B65h 65/00
[58] Field of Search........ 51/50 R, 105 R, 105 EC, 51/215 R, 215 HR, 215 HM, 215 CP, 215 H, DIG. 32; 214/1 BB, 1 BC, 1 BH, 1 BV; 90/DIG. 27; 82/DIG. 4, DIG. 5

[56] References Cited
UNITED STATES PATENTS

| | | | |
|---|---|---|---|
| 3,541,921 | 11/1970 | Helfer | 214/1 BC X |
| 3,572,519 | 3/1971 | Tezuka | 214/1 BC X |
| 3,731,822 | 5/1973 | Friesen | 214/1 BC |

Primary Examiner—Al Lawrence Smith
Assistant Examiner—Nicholas P. Godici
Attorney, Agent, or Firm—Wenderoth, Link & Ponack

[57] ABSTRACT

An inner surface honing device for use in a honing machine which comprises a centrally bored work table rotatably provided on a main body, a work piece exchange table disposed in a position opposite to the work table, a main shaft having honing stones which extends into the work table from the lower part of the latter, and an rotatory arm disposed between the work table and the exchange table for clamping a work piece at one end while another work piece is honed at the other end. The work piece already honed is transferred onto the exchange table for removal while the work piece to be honed is positioned on the work table by mere rotation of the rotatory arm for efficient honing operation.

4 Claims, 8 Drawing Figures

INNER SURFACE HONING DEVICE WITH WORKPIECE TRANSFER MEANS

The present invention relates to a honing machine and more particularly, to an inner surface honing device for use therein.

Conventionally, a honing device for honing inner surfaces of a work piece comprises a work table rotatably mounted on a main body for rotation through driving means, and a main shaft which is equipped with a honing tool and disposed vertically toward the work table through a column which extends upwardly from the main body with the main shaft and the work table rotated simultaneously for honing the inner surface of the work piece secured on the work table.

However, the conventional honing device of the above described type has such disadvantages that the main shaft must be raised or withdrawn from the work table in attaching and removing the work piece or in exchanging the honing tool, which construction results in low working efficiency with prolonged honing cycle due to repeated withdrawal of the main shaft in the honing operation. Moreover, the presence of the column for supporting the main shaft at the side of the work table limits the installation of an automatic loader on the device with consequent large size of the honing device on the whole.

Furthermore, in such a conventional device even when a loading arm is employed for supplying the work piece from a supplying position onto the work table, the loading arm must be so arranged as to be away from the honing position during honing operation and to return to the honing position again for unloading the work piece upon completion of the honing operation, which arrangement is very inefficient with less time actually utilized for the honing operations. Additionally, clamping or unclamping of the work piece onto the work table by clamping means provided on the work table makes the operation of the device troublesome.

Accordingly, an essential object of the present invention is to provide an inner surface honing device which is easy to operate and high in working efficiency with substantial elimination of the disadvantages inherent in the conventional devices.

Another important object of the present invention is to provide an inner surface honing device of the above described type which is accurate in functioning with less time required for attaching or removing work pieces and for exchanging honing tools.

A further object of the present invention is to provide an inner surface honing device of the above described type in which a work piece is readily positioned on or removed from a work table through positioning means provided on the work table and on work piece attaching and releasing means.

A still further object of the present invention is to provide an inner surface honing device of the above described type in which supplying work pieces with inaccurate dimension to the work table is eliminated.

According to a referred embodiment of the present invention, the inner surface honing device comprises a centrally bored work table rotatably provided on a main body and having a cylindrical portion extending downward from the work table, a work piece exchange table disposed on the main body in a position opposite to and away from the work table, a main shaft having honing tools at the upper end thereof and extending into the cylindrical portion of the work table form the lower portion of the latter, with the main shaft and the work table adapted to rotate by driving means, and a rotatory arm which is provided between the work table and the exchange table and which has work piece attaching and releasing means at opposite ends thereof through universal joints, with the rotatory arm adapted to move upward or downward for honing the work piece at one end thereof above the work table and for attaching or releasing the work piece at the other end thereof above the exchange table.

In the above described device of the invention, since the main shaft equipped with the honing stones is adapted to extend into the central portion of the work table from the lower part of the latter, the entire upper surface of the work table is completely free from any obstacle such as a column for supporting the main shaft as in the conventional devices for advantageously disposing the rotatory arm between the work table and the exchange table. As the arm is not only rotatable but also movable upward or downward, the work piece clamped to one end of the arm at the exchange table can be transferred onto the work table by mere rotation of the arm with the work piece honed in the clamped state, thus making the most of time for honing operation and also facilitating the replacement of the honing tools.

Furthermore, in the honing device of the invention, since the arm is provided with positioning means for allowing the work piece attaching and releasing means to rotate only during the honing operation, while the work piece attaching and releasing means and the work table have positioning means for the work piece, accurate honing of the work piece and attaching the same to the arm at the exchange table are made very easily.

Figure 4:
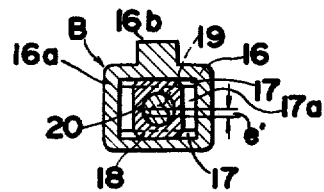
Figure 2:
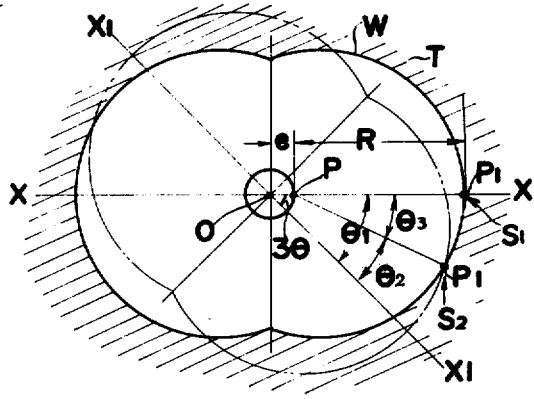
Figure 5:
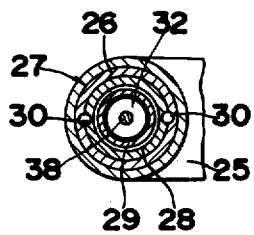
Figure 7:
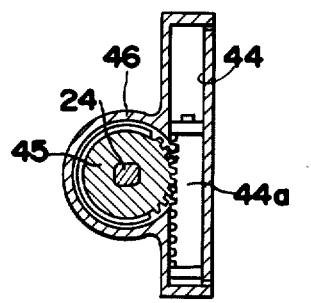
Figure 6:
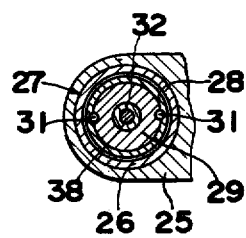
Figure 8:
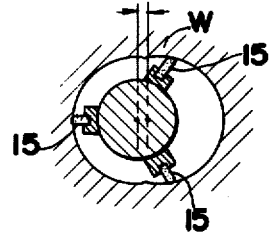
Figure 3:
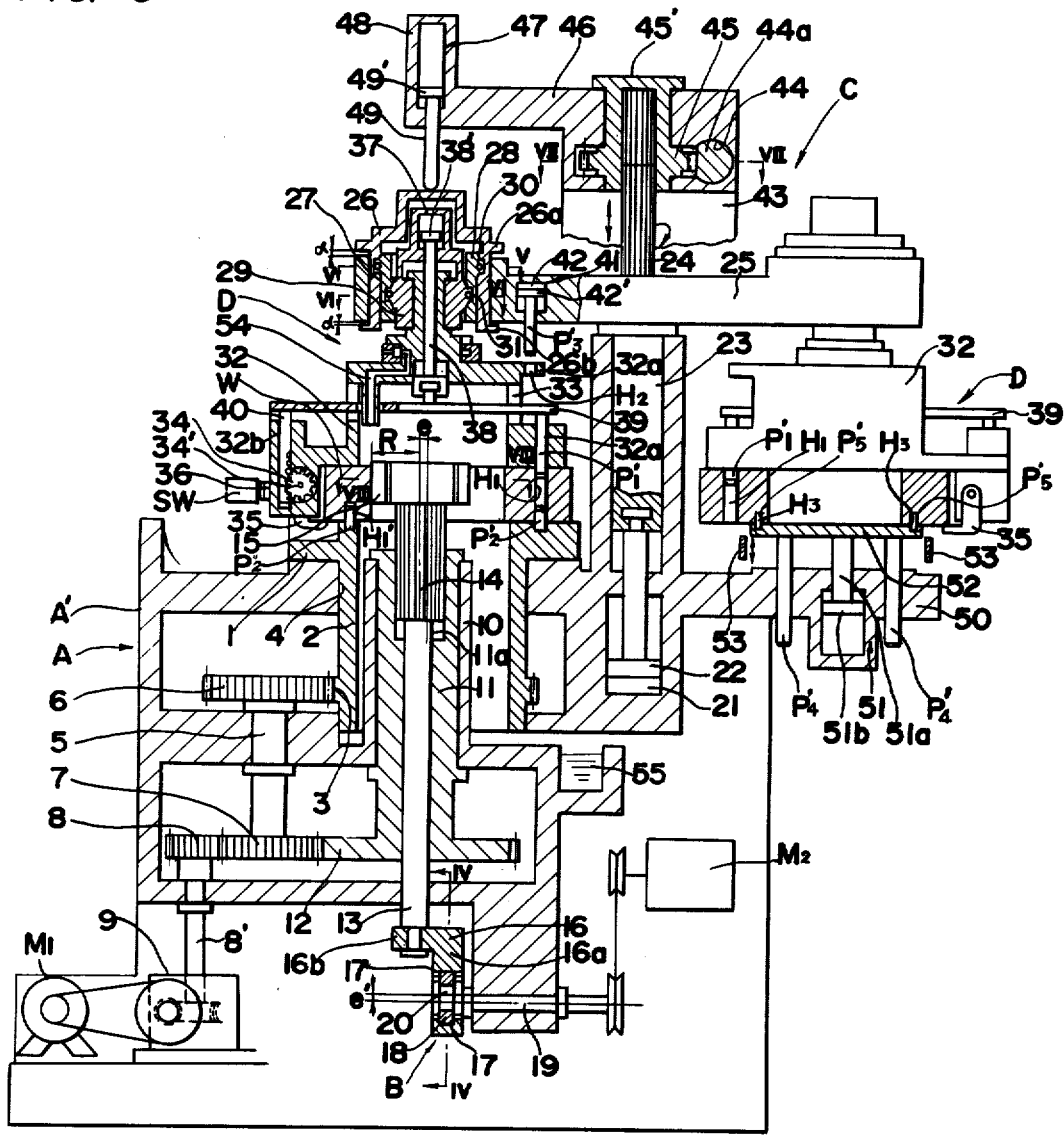

These and other objects and features of the present invention will become apparent from the following description taken in conjunction with the preferred embodiment thereof with reference to the accompanying drawings, in which;

FIGS. 1 and 2 are schematic views for describing the principles of the present invention, FIG. 3 is a side elevation view, partly in section, of an inner surface honing device according to the present invention, FIG. 4 is a sectional view, on an enlarged scale, taken along the line IV—IV of FIG. 3, FIG. 5 is a sectional view, on an enlarged scale, taken along the line V—V of FIG. 3, FIG. 6 is a sectional view, on an enlarged scale, taken along the line VI—VI of FIG. 3, FIG. 7 is a sectional view, on an enlarged scale, taken along the line VII-VII of FIG. 3, and FIG. 8 is a sectional view, on an enlarged scale, taken along the line VIII—VIII of FIG. 3.

Before the description of the present invention proceeds, it is to be noted that like parts are designated by like numerals throughout several views of the accompanying drawings.

Referring to FIGS. 1 and 2 explanatory of the principles of the honing device of the invention, it is known that if a point P at a distance e from a center O is revolved around said center O at an angular velocity $3\theta$ with a point P1 at a distance R from said point P rotated on the own axis of said point P1 at an angular velocity $\theta$ about said point P, the point P1 forms a two-lobed trochoidal curve on a table T.

On the supposition that the points P and P1 are at a position S1 on the X—X axis which is the major axis of the trochoidal form, if the table T is rotated, with the point P fixed, about the center O through an angle $\theta 1$ to bring the X—X axis to a position of X1—X1 axis with the point P1 transferred to a position S2, it is necessary that the ratio of the angle $\theta 1$ to an angle $\theta 2$ should be $3\theta : \theta$ in order to bring the point P1 on the position S2 to a starting point of the trochoidal form on the table T relative to the X1—X1 axis (FIG. 2).

Accordingly, for returning the point P1 on the position S2 and the X1—X1 axis back to the original position for coincidence with the axis X—X, if the table T is rotated at an angular velocity $3\theta$ with the point P1 on the position S2 rotated at an angular velocity $2\theta$ about the point P, the point P1 on the position S2 moves to the position S1 forming the trochoidal form on the table T.

In other words, when a work piece W having the trochoidal shaped inner surface formed as in FIG. 1 is placed on the table T with the table T and the point P1 rotated in the relation as described in FIG. 2, the point P1 slides along the trochiodal-shaped inner surface of the work piece W.

Referring now to FIGS. 3 to 8, a centrally bored work table 1 (equivalent to T in FIGS. 1 and 2) has an integral cylindrical portion 2 extending downward at right angles therefrom which is received in a bore 4 formed at the upper portion of a main body A' of the honing device A and is adapted to rotate freely on the upper surface of the main body A', while a gear 3 formed at the lower part of the cylindrical portion 2 engages with a gear 6 for rotating the table 1, which gear 6 is fixedly mounted on the upper part of a shaft 5 rotatably supported by the body A'. A main shaft rotating gear 7 fixedly mounted at the lower part of the shaft 5 meshes with a gear 8 secured to the upper part of a shaft 8' which is rotatably supported by the body A' with the lower end of the shaft 8' adapted to be rotated by a driving force of a motor M1 through transmission means and a reduction gear 9, so that the work table 1 rotates on the upper surface of the body A'.

A sleeve portion 10 extends upwardly at right angles from the body A' into the cylindrical portion 2 of the table 1 to such an extent that the upper end of the sleeve portion 10 reaches a position close to the under surface of the table 1 with the axis of said sleeve portion 10 deviated from the axis of the cylindrical portion 2 by a distance $e$. A cylinder 11 having, at the lower portion thereof, a gear 12 which engages the gear 7 is rotatably received in the sleeve portion 10 with the upward or downward movement of the cylinder 11 suitably prevented.

In the cylinder 11, a main shaft 13 having, at the upper end thereof, three honing stones 15 releasably attached thereto at an angle of 120° to one another is inserted with the outer edge of each of the honing stones 15 spaced away from the axis of the cylinder 11 by a distance R. The main shaft 13 has a splined portion 14 at the upper part thereof, which portion 14 engages a corresponding splined portion 11a in the cylinder 11, so that the shaft 13 is axially movable upward or downward and can be rotated with the cylinder 11.

It is needless to say that the main shaft 13 and the associated mechanisms therewith may be so arranged that the main shaft 13 horizontally moves leftward and rightward instead of the upward and downward movements described in the above embodiment.

It should be noted that the work table 1 and the main shaft 13 are adapted to rotate at a ratio of 3 to 2.

Accordingly, as is clear from the principle earlier mentioned, when the work piece W having the trochoidal shaped inner surface is fixed on the work table 1 with the motor M1 rotated, the trochoidal inner surface of the work piece W can be honed.

The reason for disposing the three honing stones 15 radially, outwardly extending form the main shaft 13 at an angle of 120° to one another is that, since the rotating ratio of the work table 1 to the main shaft 13 is 3 to 2 with the table 1 returning to the original position after one revolution thereof when the main shaft 13 has made two-thirds turn, each of the honing stones 15 disposed at an angle of 120° moves along the trochoidal inner surface on the same principle without any inconvenience, which arrangement of the honing stones 15 is effective not only for improving working efficiency but for maintaining high honing accuracy without distortion of the main shaft 13 due to unbalanced centrifugal force.

Traversing means B provided at the lower portion of the main shaft 13 includes a casing 16 of an L-shaped cross section having a portion 16a disposed adjacent and in parallel to the axis of the shaft 13 and a portion 16b extending horizontally at right angles from the upper end of the portion 16a. The portion 16a is provided with a rectangular opening 17a (FIG. 4) with grooves 17 formed along the upper and lower edges of the opening 17a for slidably receiving a sliding block 18 to allow lateral movement thereof. A rotating member 20 is secured to one end of a shaft 19 rotatably supported by the main body A' with the axis of the member 20 deviated from the axis of the shaft 19 by a distance $e'$, which member 20 is rotatably received in an opening centrally formed in the sliding block 18. The portion 16b of the casing 16 is secured to the lower end of the shaft 13.

Accordingly, the rotating member 20 secured to the shaft 19 with the axis thereof deviated from the axis of the shaft 19 reciprocates the sliding block 18 along the grooves 17 while driving the casing 16 upward and downward, thus imparting a traversing motion to the main shaft 13. In the traversing means B described above, the eccentric rotation of the member 20 is converted into the upward and downward movements of the shaft 13 through the sliding block 18, which mechanism is quiet in operation with little shock, being most suitable for accurate traversing motion with correct stroke.

An rotatory automatic loader C for the work piece W provided between the work table 1 and a work piece exchange table 50 mentioned later comprises a rotatory arm 25 having work piece attaching and releasing means D at opposite ends thereof with the middle portion of the arm 25 secured to the upper end of a piston rod 23 for a piston 22 received in a cylinder 21 formed in the main body A'. The rod 23 further extends through the arm 25 to form a splined shaft 24 inserted into and engaged with a cylindrical shaft 45' of a gear 45 rotatably received in a supporting portion 43 integral with the body A'. A piston rack 44a slidably received in a cylinder 44 formed in the supporting portion 43 engages the gear 45 for rotating the latter. Accordingly, by driving the piston 22 for the cylinder 21, the arm 25 can be moved upward or downward, while it is rotated through the operation of the piston 44a in the cylinder 44.

It is to be noted here that the arm 25 may be arranged to make a linear motion relative to the rod 23 instead of the rotation about the rod 23 as described above.

The work piece attaching and releasing means D includes a casing 26 received in an opening formed in each end portion of the arm 25 with slight gaps α kept between flanged portions 26a, 26b of the casing 26 and the upper and lower edges of the opening in the arm 25 respectively as in FIG. 3. A universal joint 27 comprising bearing metals or bushes 28 and 29 each having spherical outer surface and a plurality of steel balls 30 and 31 is enclosed in each casing 26 with the upper portion of a work piece attaching member 32 rotatably received in the joint 27.

A securing plate 39 which is provided on the member 32 above the work table 1 so as to be movable upward or downward through an opening 33 formed in the member 32 is connected at the central portion thereof to a piston rod 38 of a piston 38' received in a first positioning cylinder 37 which is formed in the upper portion of the bush 29 of the joint 27, and a positioning pin P'1 extends downward at right angles from one edge of the plate 39 for insertion into a bore 32a formed in the member 32, while a rack member 40 also extends downward at right angles from the other edge of the plate 39, which rack member 40 is adapted to engage, through a bore 32b formed in the attaching member 32, with a pinion 34 fixedly mounted on a rotatable shaft 34' supported by the work piece attaching member 32 so as to rotate the pinion 34 and a clamping pawl 35 which is in integral connection with the shaft 34' for clamping or releasing the work piece W placed on the work table 1 under the work piece attaching member 32.

Pins P'2 and P''2 for positioning the work piece W on the table 1 extend upwardly at right angles from the upper surface of the work table 1, the pin P'2 of which is disposed in alignment with the pin P'1 of the securing plate 39 and is adapted to be inserted into a positioning bore H1 formed in the work piece W from the under surface of the work piece W with the pin P'1 of the plate 39 inserted into the bore H1 from the upper surface of the work piece W, while the other pin P''2 disposed at a position opposite to the pin P'2 on the table 1 is adapted to be inserted into a corresponding bore H1' formed in the work piece W for correctly positioning the work piece W on the table 1.

Retaining means 41 for preventing the rotation of the work piece attaching and releasing means D provided in the arm 25 includes a piston rod P'3 of a piston 42' enclosed in a cylinder 42 formed in the arm 25, which rod P'3 is adapted to be inserted, upon operation of the piston 42', into a bore H2 formed in a flange portion 32a of the work piece attaching member 32 so as to determine the horizontal angle of rotation of the work piece W for correctly supplying the same to the work table 1 with the retaining means 41 disengaged from the work piece W during honing of the latter.

An arm 46 formed in the upper part of the supporting portion 43 of the main body A' is provided with work piece depressing means 47 at the end portion of the arm 46 above the casing 26 received in the rotatory arm 25. The depressing means 47 comprises a piston rod 49 of a piston 49' received in a cylinder 48 formed in the arm 46 with the rod 49 aligned with the axis of the work table 1 for depressing the casing 26 and for pressing the work piece W tightly against the work table 1.

The work piece exchange table 50 formed at one side of the main body A' in a position opposite to the work table 1 includes a platform 52 which is disposed on the table 50 so as to be movable upward or downward through a pair of spacedly disposed pins P'4 each extending downward at right angles form the under surface of the platform 52 to be slidably received in a corresponding bore formed in the table 50, a piston rod 51a secured to the central portion of the platform 52, a piston 51b of the rod 51a enclosed in a cylinder 51 formed in the table 50 for moving the platform 52, and a pair of arms 53 for intermittently supplying the work piece W, which arms 53 are disposed above the table 50 close to the platform 52 with the platform 52 positioned therebetween.

A pair of pins P'5, each of which extends upward at right angles from the upper surface of the platform 52, are for insertion into corresponding bores H3 formed in the work piece W and for positioning the work piece W so that the positioning pin P'1 of the securing plate 39 can be correctly inserted into the bore H1 of the work piece W.

By this arrangement, when the work piece W is supplied onto the predetermined place on the exchange table 50, the platform 52 is raised through the piston rod 51a until the upper surface of the work piece W contacts the under surface of the work piece attaching member 32.

Subsequently, the securing plate 39 is lowered by the piston 38' in the cylinder 37 through the piston rod 38 so as to insert the positioning pin P'1 of the plate 39 into the bore H1 of the work piece W and to rotate the clamping pawl 35 through the rack 40 and pinion 34 for securing the work piece W onto an automatic loader C, in which case if the bore H1 of the work piece W does not coincide with the positioning pin P'1 of the plate 39 or if the work piece W is not secured to the member 32 by the clamping pawl 35, the work piece W with inaccurate dimension should be replaced. However, such replacement can be made very easily without affecting the honing operation, since the attachment of the work piece W to the automatic loader C at the exchange table 50 is carried out while another work piece W is being honed on the work table 1.

After completion of the attachment of the work piece W to the attaching member 32 as described above, the arm 25 is raised by the piston rod 23 through the action of the piston 22 in the cylinder 21 and subsequently rotated through an angle of 180° by the action of the piston rack 44a engaging the gear 45 with the work piece W attached to the exchange table 50 being positioned over the work table 1. Subsequently, the arm 25 is lowered through downward movement of the piston 22 for the cylinder 21 with the positioning pins P'2 and P''2 projecting form the table 1 inserted into the corresponding bores H1 and H1' formed in the work piece W and with the work piece W fixed in the predetermined position on the work table 1. The work piece W is further pressed against the work table 1 by the rod 49 through the casing 26 as the piston 49' in the depressing cylinder 48 moves downward, and subsequently the piston rod P'3 for the second positioning cylinder 42 in the arm 25 is pulled out of the bore H2 in the work piece attaching member 32 for allowing the work piece attaching and releasing means D to rotate together with the work table 1 through the universal joint 27.

In this state, when the motors M1 and M2 are driven, the work table 1 and the main shaft 13 are rotated at the rotating ratio of 3 to 2, while the main shaft 13 starts the traversing motion and hones the trochoidal inner surface of the work piece W with the honing stones 15 fixed to the upper part of the main shaft 13.

A proximity switch SW which closes an electrical circuit when the former approaches a projection 36 formed on the side wall of the attaching member 32 is adapted to stop the motors M1 and M2 and consequently the work table 1 correctly at a predetermined position.

While the work piece W is being honed on the work table 1 as described above, another work piece W to be subsequently worked is attached to the means D provided on the other end of the arm 25 above the exchange table 50.

Upon completion of one honing operation, the depressing rod 49 is raised and simultaneously the rod P'3 for the piston 42' in the second positioning cylinder 42 is inserted into the bore H2 in the attaching member 32 for positioning the work piece attaching and removing means D, with the arm 25 again raised through the rod 23 of the poston 22 in the cylinder 21, and subsequently with the arm 25 rotated through an angle of 180° for positioning the work piece W to be honed on the work table 1 and the work piece W already honed above the exchange table 50. The work piece W already honed is then released on the platform 52 by raising the securing plate 39 through operation of the rod 38 of the piston 38' for the first positioning cylinder 37, and subsequently removed to a predetermined place by the arms 53 with another work piece W to be honed placed onto the table 50 for repeating the same operation for honing as described earlier.

While the work piece W is being honed, coolant is supplied to the honing position through a nozzle 54 formed in the attaching member 32, which coolant is discharged into a tank 55 through the cylindrical portion 2 of the work table 1.

Although the description of the above embodiment refers to the honing operation for the work piece having the trochoidal inner surface, it is needless to say that the application of the device of the invention is not limited to the above embodiment, and if a branch arm is adapted, it is possible to perform attaching, honing and removal of the work pieces at separate positions corresponding to the branches of the arm respectively.

As is clear from the foregoing description, in the honing device of the invention, the rotatable arm having, at opposite ends thereof, the work piece attaching and releasing means mounted thereto through the universal joints is disposed between the work table and the exchange table so as to be movable upward or downward for honing the work piece W at one end of the arm above the work table and for attaching or releasing the work piece W to or from the other end of the arm above the exchange table, while the honing operation is carried out with the work piece W clamped to the work piece attaching and releasing means, which arrangement is very effective for improving working efficiency.

Moreover, since the attachment of the work piece to the attaching member of the rotatory arm above the exchange table is quickly made in a short period of time, any work piece with inaccurate dimension can be checked in advance without supplying faulty work pieces to the work table, thus eliminating possibility for loading the work table with such a faulty work piece.

The work piece attaching and releasing means which is adapted to rotate together with the work piece during honing operation is effective for improving working environment, since, by this arrangement, the coolant can be supplied to the honing position in approximately sealed condition.

Furthermore, the provision of the positioning means between the rotatory arm and the work piece and also between the work piece and the attaching and releasing means advantageously facilitates accurate honing of the work table and the attachment of the work piece to the rotatory arm at the exchange table.

Additionally, it is to be noted that the concept of the honing device of the invention as detailed in the foregoing embodiment may also be applicable to other machine tools, such as grinding machines, polishing machines, milling machines and the like with minor alterations in the associated mechanisms.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. An inner surface working device for use in a working machine which comprises a centrally bored work table mounted on a main body so as to be rotatable about a fixed axis of said work table, driving means for rotating said work table, a main shaft which extends through said central bore of said work table and which is equipped with working tool means at an end thereof, driving means for rotating said main shaft, arm means provided adjacent to said work table for supplying a work piece to be worked onto said work table and for removing said work piece which has been worked form said work table, said arm means being provided with work piece attaching and releasing means for clamping and unclamping said work piece to and from said arm means, means for mounting said work piece attaching and releasing means to said arm means so that said work piece attaching and releasing means can be rotated on said arm means about a fixed axis of the former, means for positioning said work piece at a predetermined position on said work table, said positioning means being provided on said work piece attaching and releasing means and also on said work table, and means for preventing rotation of said work piece attaching and releasing means during positioning of said work piece onto said work table, said means for preventing rotation being provided between said arm means and said work piece attaching and releasing means and adapted to release said work piece attaching and releasing means for allowing rotation of the latter during working operation, whereby said work piece attaching and releasing means rotating together with said work table with said work piece clamped to said work piece attaching and releasing means during working operation.

2. An inner surface honing device for use in a honing machine which comprises a centrally bored work table mounted on a main body so as to be rotatable about a fixed axis of said work table, driving means for rotating said work table, a main shaft which extends upwardly through said central bore of said work table from a lower portion of said work table and which is equipped with honing tool means at an upper end thereof, driving means for rotating said main shaft, arm means rotatably provided adjacent to said work table for supplying a work piece to be honed onto said work table and for removing said work piece which has been honed from said work table, said arm means being provided with work piece attaching and releasing means for clamping and unclamping said work piece to and from said arm means, means for mounting said work piece attaching and releasing means to said arm means so that said work piece attaching and releasing means can be rotated on said arm means about a fixed axis of the former, means for positioning said work piece at a predetermined position on said work table, said positioning means being provided on said work piece attaching and releasing means and also on said work table, and means for preventing rotation of said work piece attaching and releasing means during positioning of said work piece onto said work table, said means for preventing rotation being provided between said arm means and said work piece attaching and releasing means and adapted to release said work piece attaching and releasing means for allowing rotation of the latter during honing operation, whereby said work piece attaching and releasing means rotating together with said work table with said work piece clamped to said work piece attaching and releasing means during honing operation.

3. An inner surface honing device as claimed in claim 2, wherein said arm means comprises a single arm rotatably disposed between said work table and an exchange table for transferring said work piece to be honed onto said work table from said exchange table and simultaneously for transferring said work piece already honed onto said exchange table from said work table, said exchange table being disposed on said main body in a position spaced away from and opposite to said work table with one end of said arm located above said exchange table and with the other end of said arm located above said work table during honing operation.

4. An inner surface honing device as claimed in claim 2, wherein said arm means comprises an arm having a plurality of branch arms so that attaching said work piece to be honed to said attaching and releasing means, said honing operation of said work piece and removal of said work piece already honed can be made at separate positions corresponding to said branches of said arm respectively.

* * * * *